(12) United States Patent
Hashimoto et al.

(10) Patent No.: US 10,633,161 B2
(45) Date of Patent: Apr. 28, 2020

(54) AIR CUSHIONING MATERIAL

(71) Applicant: Konica Minolta, Inc., Chiyoda-ku, Tokyo (JP)

(72) Inventors: Takeshi Hashimoto, Okazaki (JP); Hiromi Mizuguchi, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 159 days.

(21) Appl. No.: 15/889,780

(22) Filed: Feb. 6, 2018

(65) Prior Publication Data

US 2018/0237201 A1 Aug. 23, 2018

(30) Foreign Application Priority Data

Feb. 17, 2017 (JP) .................................. 2017-028283

(51) Int. Cl.

| B32B 3/10 | (2006.01) |
|---|---|
| B65D 81/05 | (2006.01) |
| B32B 3/28 | (2006.01) |
| B32B 27/32 | (2006.01) |
| B32B 1/00 | (2006.01) |
| B32B 27/08 | (2006.01) |
| B32B 7/05 | (2019.01) |

(52) U.S. Cl.
CPC .............. *B65D 81/052* (2013.01); *B32B 1/00* (2013.01); *B32B 3/28* (2013.01); *B32B 7/05* (2019.01); *B32B 27/08* (2013.01); *B32B 27/32* (2013.01); *B65D 81/054* (2013.01); *B32B 2307/56* (2013.01); *B32B 2553/02* (2013.01)

(58) Field of Classification Search
None
See application file for complete search history.

(56) References Cited

U.S. PATENT DOCUMENTS

| 7,066,331 B2 * | 6/2006 | Koyanagi | ............ B65D 81/052 206/522 |
|---|---|---|---|
| 2004/0163991 A1 | 8/2004 | Koyanagi et al. | |
| 2013/0168286 A1 | 7/2013 | Liao et al. | |
| 2016/0347529 A1 | 12/2016 | Liao et al. | |

FOREIGN PATENT DOCUMENTS

| CN | 1481326 A | 3/2004 |
|---|---|---|
| CN | 103241456 A | 8/2013 |
| CN | 105644941 A | 6/2016 |
| JP | H-07-291357 A | 11/1995 |
| JP | H-08-230945 A | 9/1996 |

OTHER PUBLICATIONS

Office Action issued in corresponding Chinese Patent Application No. 201810260929.6, dated Apr. 12, 2019 (14 pages).

* cited by examiner

*Primary Examiner* — Christopher M Polley

(74) *Attorney, Agent, or Firm* — Buchanan Ingersoll & Rooney PC

(57) ABSTRACT

An air cushioning material includes: a belt-like part between a first and second air cells into which air is sealed, wherein side edges of the first and second air cells are connected to each other via the belt-like part; and an air flow passage that is formed in the belt-like part and communicates the first and second air cells, wherein at least a part including the air flow passage in the belt-like part is in a shape folded in a way from the first air cell to the second air cell.

12 Claims, 13 Drawing Sheets

AIR CUSHIONING MATERIAL

The entire disclosure of Japanese patent Application No. 2017-028283, filed on Feb. 17, 2017, is incorporated herein by reference in its entirety.

BACKGROUND

Technological Field

The present invention relates to an air cushioning material to be inserted into a gap between an article and a packing box, for protecting the article when the article to be packed is stored in the packing box.

Description of the Related Art

In transporting articles such as printers, copiers, and PCs, emphasis is placed on how to protect the articles from shocks during transportation. In response to such request for protection of an article, a foamed resin cushioning material has been mainly used to fill a gap between a packing box and the article. However, from the viewpoint of reducing an environmental load, using an air cushioning material is considered to be desirable.

As a conventional air cushioning material, there is known an air cushioning material having two or more air cells as disclosed in JP H8-230945 A.

FIG. 15 is a view showing an outline of an air cushioning material in JP H8-230945 A.

The figure shows a state where two air cushioning materials A1 and A2 are connected in a longitudinal direction, and each of the air cushioning materials A1 and A2 has a structure in which three air cells 51, 52, and 53 are connected in a triangular cylinder shape. In this way, forming the three air cells into the triangular cylinder structure allows protection of an article (hereinafter referred to as "packing object") to be stored in a packing box by filling a gap formed at a corner part or the like of the packing box.

Although the adjacent air cells 51, 52, and 53 are separated by a heat seal indicated by 81 in the figure, a length of the heat seal 81 is made slightly shorter than a vertical length of the air cells 51, 52, and 53, and there are provided passages 70u and 70v that communicate the adjacent air cells 51, 52, and 53, on both sides of the heat seal 81.

The passages 70u and 70v have a function of releasing internal air to an adjacent air cell when one air cell 51 (52, 53) receives an impact from outside, for providing a cushioning effect while suppressing rupture of the air cell 51 due to the impact.

CITATION LIST

Patent Literature 1: JP H8-230945 A
Patent Literature 2: JP H7-291357 A

When in use, the air cushioning material having the above-mentioned structure is tightly stuffed into a gap between a packing box and a packing object. Particularly when the packing object has a certain weight, sharp vibration or impact applied to the packing box from outside during transportation with a vehicle or the like causes a large external force to be applied to air cells of the air cushioning material.

For example, when the air cell 51 shown in FIG. 15 is pushed by a large external force due to vibration or shock, air in the air cell 51 rapidly pressed is to escape to the adjacent air cells 52 and 53 through the passages 70u and 70v in a short time.

Since a cushioning force no longer exists in the air cell 51 from which air has rapidly escaped, the large external force due to the vibration and impact described above acts directly on the packing object as it is, which may cause a problem of damaging the packing object.

SUMMARY

An object of the present invention is to provide an air cushioning material capable of maintaining a cushioning effect even when a sharp and large external force is suddenly applied on an air cell.

To achieve the abovementioned object, according to an aspect of the present invention, an air cushioning material reflecting one aspect of the present invention comprises: a belt-like part between a first and second air cells into which air is sealed, wherein side edges of the first and second air cells are connected to each other via the belt-like part; and an air flow passage that is formed in the belt-like part and communicates the first and second air cells, wherein at least a part including the air flow passage in the belt-like part is in a shape folded in a way from the first air cell to the second air cell.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of an air cushioning material according to the present invention will be described with reference to the drawings. However, the scope of the invention is not limited to the disclosed embodiments.

[1] Overall Structure of Air Cushioning Material

Figure 1:
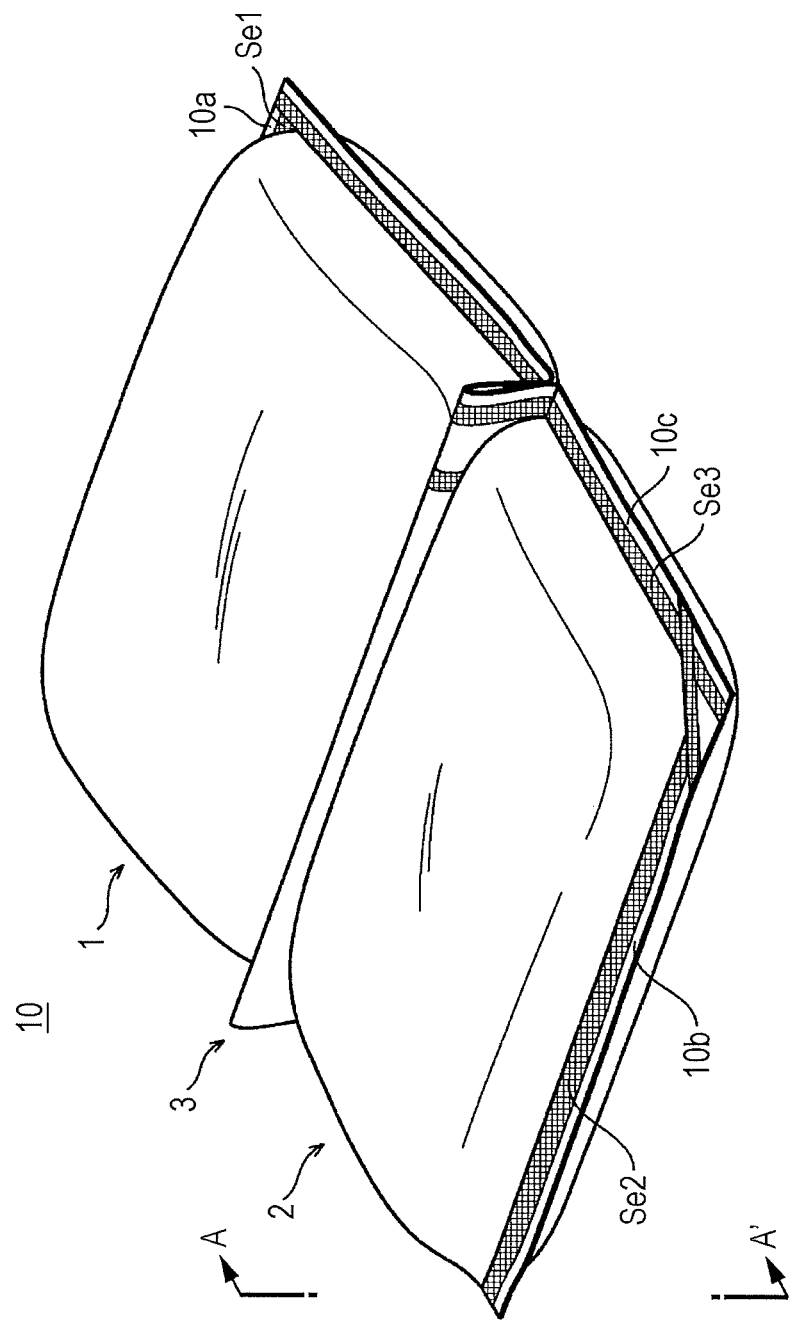
FIG. 1 is a view showing an appearance of an air cushioning material according to an embodiment of the present invention.
Figure 2:
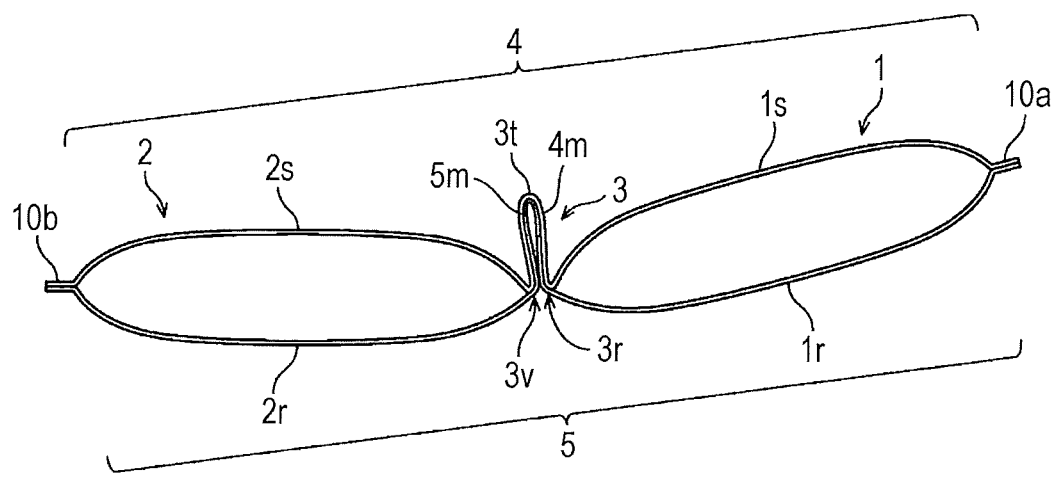
FIG. 2 is a cross-sectional view when the air cushioning material is cut at a position of A-A' line in FIG. 1.

FIG. 1 is an external perspective view of an air cushioning material 10 according to a first embodiment. As shown in this figure, the air cushioning material 10 is made up of two air cells 1 and 2, and an intermediate belt-like part 3 existing in the middle of the air cells 1 and 2. FIG. 2 is a cross-sectional view when the air cushioning material 10 is cut at a position of A-A' line in FIG. 1.

As shown in FIG. 2, the air cell 1 is made up of a front sheet part 1s and a rear sheet part 1r, while the air cell 2 is made up of a front sheet part 2s and a rear sheet part 2r. A peripheral edge 10a of the front and back sheet parts 1s and 1r, and a peripheral edge 10b of the front and back sheet parts 2s and 2r are respectively welded, while a center part is folded up so as to protrude upward and its root part is welded to form the intermediate belt-like part 3.

Then, welding of a peripheral edge 10c with the air cells 1 and 2 filled with air provides the shape as shown in FIG. 1.

In addition, it is also acceptable to weld necessary parts leaving an air inlet, fill the whole with air, and then weld the air inlet to hermetically seal.

Mesh parts Se1, Se2, and Se3 in FIG. 1 are welded parts. In the present embodiment, each of the air cells 1 and 2 is substantially square in plan view, but the shape of the air cells 1 and 2 is not limited thereto.

Figure 3:
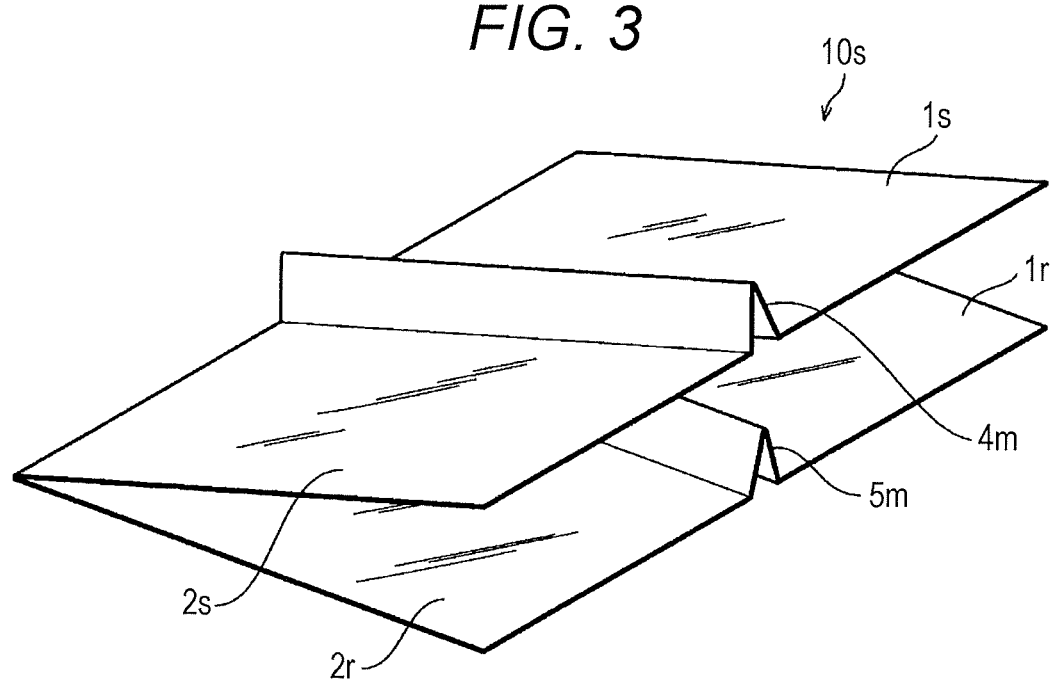
FIG. 3 shows a state where the air cushioning material is developed.

The front sheet parts 1s and 2s of the air cells 1 and 2, and a front sheet part 4m of the intermediate belt-like part 3 are connected, while the rear sheet parts 1r and 2r, and a rear sheet part 5m of the intermediate belt-like part 3 are connected. In the absence of the above sealing by welding, as shown in FIG. 3, the front sheet parts 1s and 2s of the air cells 1 and 2, and the front sheet part 4m of the intermediate belt-like part 3, as well as the rear sheet parts 1r and 2r, and the rear sheet part 5m of the intermediate belt-like part 3 can be developed as one long sheet 10s. This enables the air cells 1 and 2 and the intermediate belt-like part 3 to be integrally formed by a highly airtight resin sheet member. Here, for example, low density polyethylene can be used as the airtight resin sheet member.

It is also possible to separately form the air cells 1 and 2 and the intermediate belt-like part 3, and connect them to form the air cushioning material 10.

[2] Structure of Intermediate Belt-Like Part 3

As shown in the sectional view of FIG. 2, in the intermediate belt-like part 3, two front and rear sheet parts 4m and 5m are mountain-folded and layered at a center part to form a folded-shaped part. In the two front and back sheet parts 4m and 5m in the folded-shaped part, the root part of the folded-shaped part of the intermediate belt-like part 3 is sealed by welding along a longitudinal direction of the intermediate belt-like part 3 (X direction in FIG. 4A), expect a part to become an air flow passage.

Figure 4A:
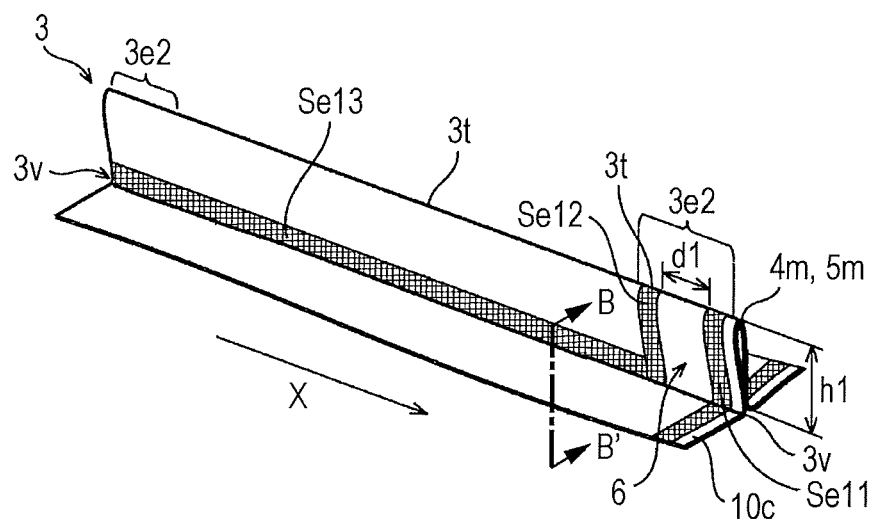
FIG. 4A shows an intermediate belt-like part in a folded state.

FIG. 4A is a view showing the intermediate belt-like part 3 and its peripheral part cut out from the air cushioning material 10. As shown in this figure, a welded part Se13 that welds four resin sheets of the intermediate belt-like part 3 is formed along the longitudinal direction X, allowing the intermediate belt-like part 3 to be folded in two, and one space to be divided into two spaces of the air cells 1 and 2.

The welded part Se13 is ended on a way on an end side (end-vicinity part 3e1) in the longitudinal direction X of the intermediate belt-like part 3, and is connected to the welded part Se12. The welded part Se12 extends to a top part (folded part) 3t of the intermediate belt-like part 3, while being parallel to the welded part Se11 at the peripheral edge 10c.

A similar welded part is also present on a rear surface side of the intermediate belt-like part 3, and a part surrounded by these welded parts (part of a width d1 between the welded part Se11 and the welded part Se12) serves as an air flow passage 6 that communicates the two air cells 1 and 2.

An air flow passage is not formed on the opposite end 3e2 side of the intermediate belt-like part 3.

Figure 4B:
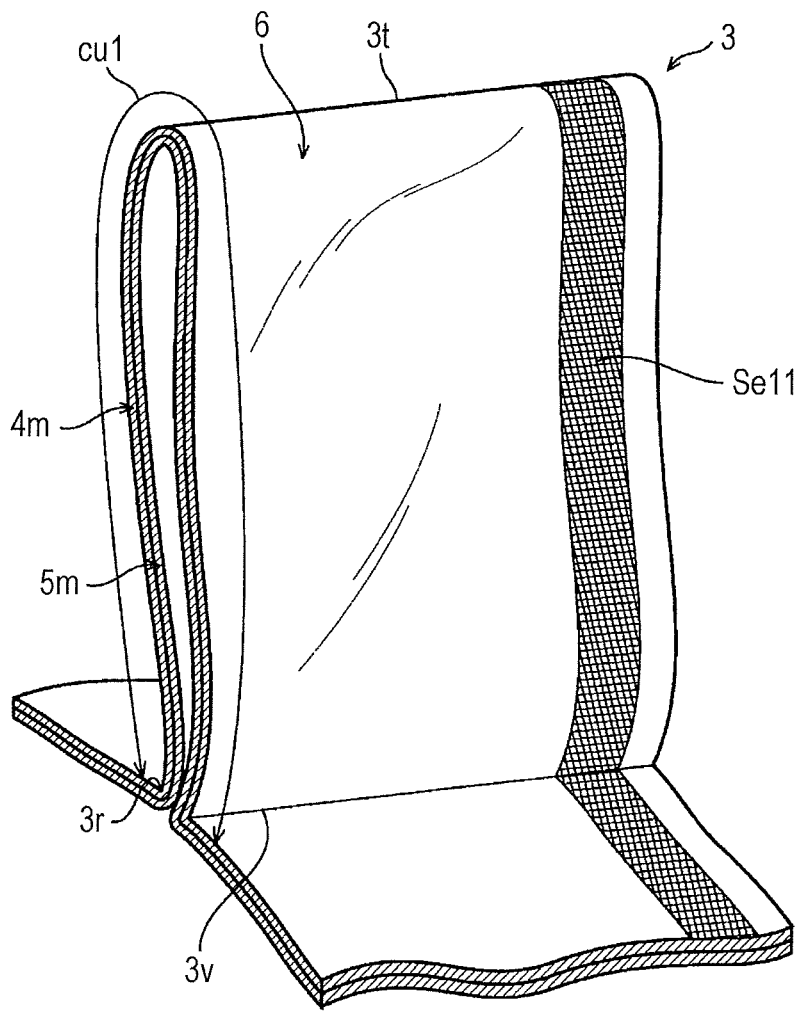
FIG. 4B is a view showing a state where a part provided with an air flow passage in the intermediate belt-like part is cut at a position of line B-B' in FIG. 4A.

FIG. 4B is a cross-sectional view in which a part provided with the air flow passage 6 in the intermediate belt-like part 3 is cut at a position of line B-B' in FIG. 4A. As shown in FIG. 4B, since the front sheet part 4m and the rear sheet part 5m are layered and folded at the top part 3t of the intermediate belt-like part 3 while root parts (base part) 3v and 3r of the intermediate belt-like part 3 between with the air cells 1 and 2 are valley-folded, a flow path resistance in the air flow passage 6 is high, inhibiting an easy flow of air from one air cell to another air cell. When an internal pressure of one of the air cells reaches a predetermined value or more, the air enters the air flow passage 6 so as to push apart the front sheet part 4m and the rear sheet part 5m of the intermediate belt-like part 3.

A height h1 (FIG. 4A) of the intermediate belt-like part 3 is appropriately determined such that a flow path length cu1 of the intermediate belt-like part 3 (indicating a way proceeding through the air flow passage 6 along a short side of the intermediate belt-like part 3) has dimensions necessary for securing a path when the air moves to push apart in the gap above. In particular, the height h1 and width d1 of the air flow passage 6 are determined to avoid immediate escape of air to the another air cell 2 with the flow path resistance of the folded part, and to move the air with a certain time delay, when a sharp pushing force is applied to the one air cell 1.

However, regarding the height h1 of the air flow passage 6, as described below, since the air cushioning material 10 is arranged in a corner part of a packing object such that the air cells 1 and 2 are opened in an L-shape (see FIG. 5C) with the intermediate belt-like part 3 positioned inside as an actual form of usage, the top part 3t of the intermediate belt-like part 3 desirably has a height not to conflict with the packing object in this state.

[3] Usage Mode

Figure 5A:
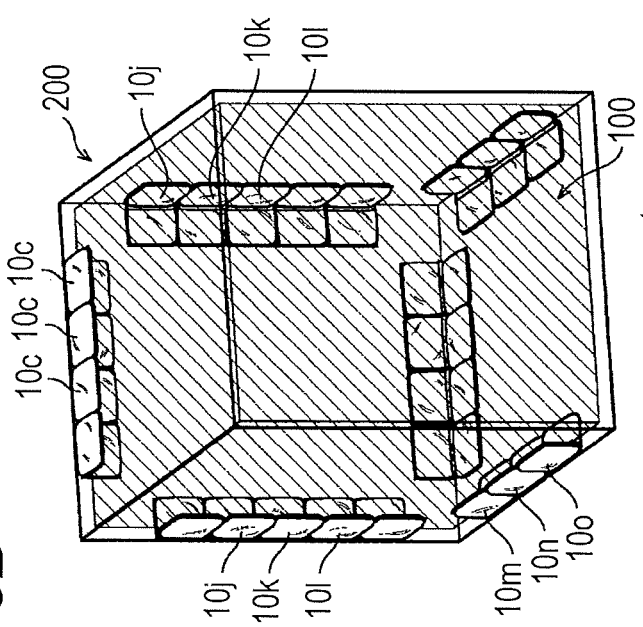
FIG. 5A is view showing an arrangement example when the air cushioning material is attached to a copying machine as a packing object.

A desirable usage example of the air cushioning material having the above-described configuration will be described. For example, for packing the copying machine 100 as shown in FIG. 5A as a heavy packing object in a packing box, the copying machine is provided with air cushioning materials indicated by 10a, 10b, 10c, 10d . . . at points corresponding to a corner part of the packing box, and stored in the packing box.

Figure 5B:
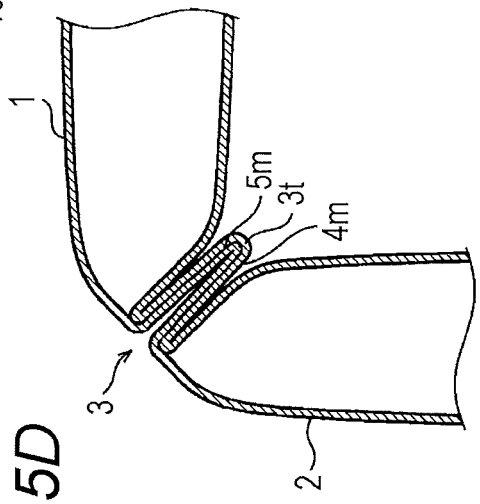
FIG. 5B is a view showing the air cushioning material in a state of being stored in a packing box.

As shown in FIG. 5B, the air cushioning materials 10a, 10b, 10c, 10d . . . each are stuffed into a gap between a wall surface of a packing box 200 and a side surface of the copying machine 100 in a normal state where no external force is applied to the packing box.

Figure 5C:
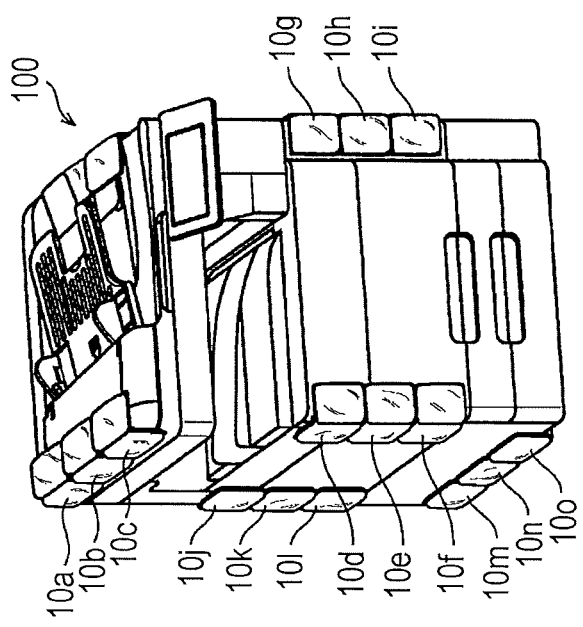
FIG. 5C is a schematic view showing a state of the air cushioning material arranged in a gap at a corner part of the packing object.

As shown in FIG. 5C, the air cells 1 and 2 are arranged at a corner part of the copying machine 100 such that the air cells 1 and 2 are bent so as to form a substantially L-shape with the intermediate belt-like part 3 positioned inside.

The folded part of the intermediate belt-like part 3 is set to the height h1 (FIG. 4A) not to interfere with the packing object and can be inclined in a free direction, and when an external force is applied to one air cell, the passage can be gradually expanded to allow air to flow into another air cell. This process will be described with reference to FIGS. 6A to 6D.

Here, it is assumed that a large external force is applied on the packing box 200, for example, by sudden braking of a vehicle carrying the copying machine 100 as the packing object. For example, if an external force is applied in a direction indicated by arrow (1) in FIG. 6A, this external force starts pressing the air cell 1. Since the external force is not applied to the other air cell 2, its normal state is maintained.

However, since the air flow passage 6 is in a closed state, the air in the air cell 1 is compressed without escaping to the air cell 2 at a beginning when the external force starts to be applied. Therefore, the air cell 1 functions as an effective cushioning material against the pressing force by the external force.

Figure 5D:
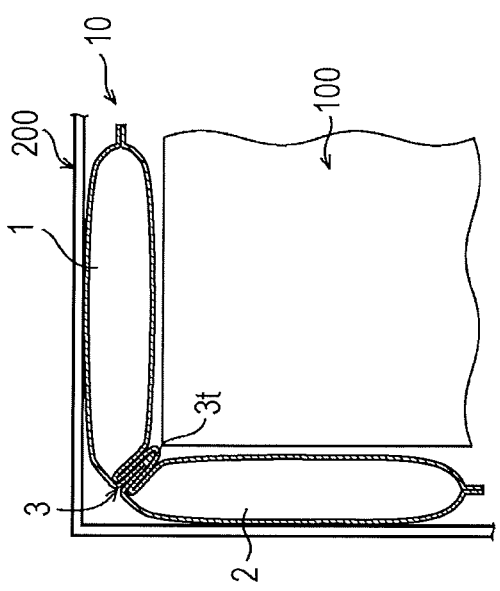
FIG. 5D is an enlarged sectional view of the intermediate belt-like part of the air cushioning material.
Figure 6A:
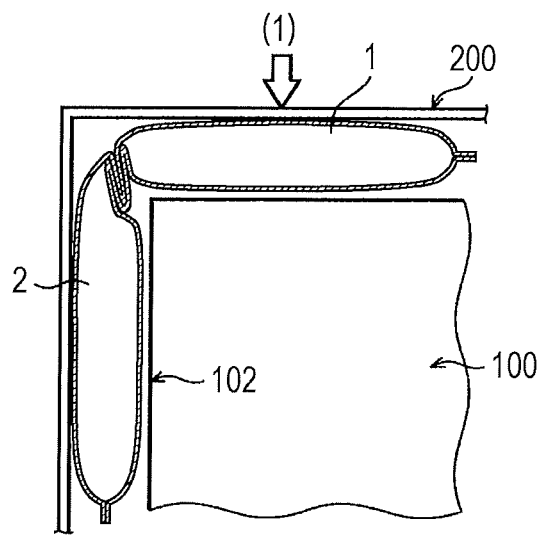
FIGS. 6A to 6D are views showing a state where air flows through the air flow passage of the intermediate belt-like part when the air cushioning material receives an external pressure.
Figure 6B:
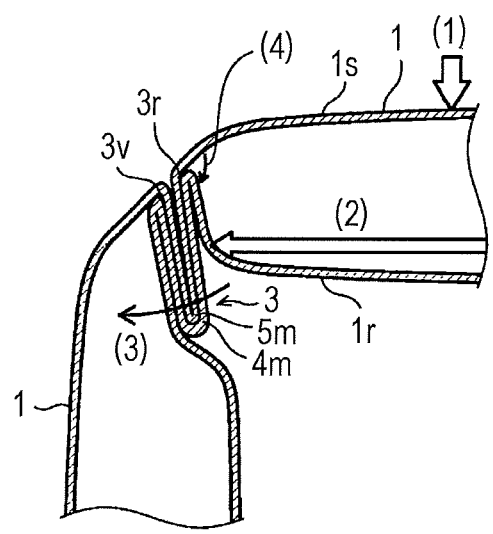

When pressure in the air cell 1 is increased, and this pressure acts on the intermediate belt-like part 3, the cross section of the intermediate belt-like part 3 results in a state shown in FIG. 6B from a state shown in FIG. 5D. In other words, since the air cell 1 on the impacted side expands and deforms to spread in a lateral direction as indicated by arrow (2), the intermediate belt-like part 3 is pushed and inclined in a direction indicated by arrow (3).

This opens a contact part between the front sheet part 1s and the rear sheet part 1r at the valley-folded part of the root part 3r on the air cell 1 side, as indicated by arrow (4).

Figure 6C:
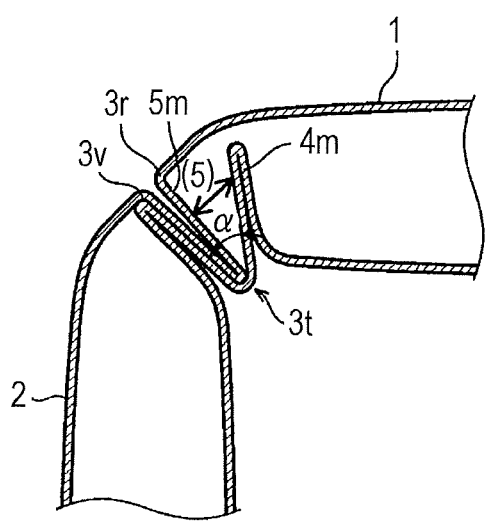

Further increase in the external force increases the internal pressure of the air cell 1, and then in combination with the inclination of the intermediate belt-like part 3 toward the air cell 2 side, allows air to enter the air flow passage 6 on a side close to the air cell 1 as shown in FIG. 6C. Then, the air gradually spreads between the front sheet part 4m and the back sheet 5m in the air flow passage 6 of the intermediate belt-like part 3 as indicated by arrow (5).

This increases angle α formed between the front sheet part 4m and the rear sheet part 5m, from the root part 3r to the top part 3t of the intermediate belt-like part 3, and the increase in the internal pressure of the air cell 1 now acts to widen the folded part of the top part 3t.

Figure 6D:
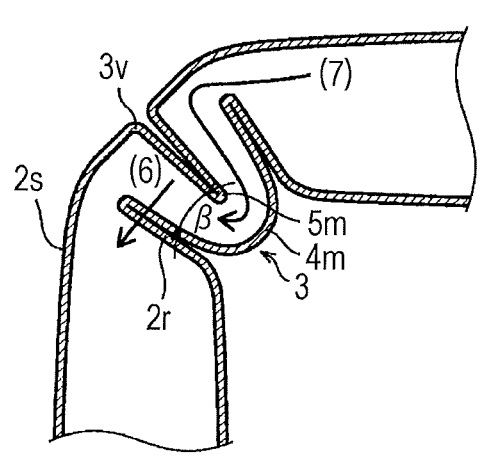

The air having entered beyond the folded part increases angle β formed between the front sheet part 4m and the rear sheet part 5m, from the top part 3t to the root part 3v of the intermediate belt-like part 3, and then spreads the valley-folded part of the root part 3v as indicated by arrow (6) in FIG. 6D, and the air flow passage 6 is opened from the air cell 1 to the air cell 2 side to release the air on the air cell 1 side to the air cell 2 side (arrow (7)).

Since there is a time difference after a sudden large external force starts to act until the air flow passage 6 releases the air in the air cell 1 to the other air cell 2 in this way, the one air cell 1 acts as an effective cushioning material against the external force in the beginning, while air is released to the other air cell 2 before the upper limit of the cushioning action of the air cell 1 alone is exceeded, enabling protection of the air cell 1 and appropriate cushioning action to be sustained.

Thereafter, when the external force indicated by arrow (1) disappears, the air gradually returns to the air cell 1 to balance the internal pressure as time elapses, and the air cells 1 and 2 return to the state close to FIG. 5D. Since the balance of volume between the air cells 1 and 2 is naturally maintained by air movement via the air flow passage 6, it is possible to continue to exhibit cushioning performance for a long period of time.

[4] Evaluation of Cushioning Performance

Figure 7C:
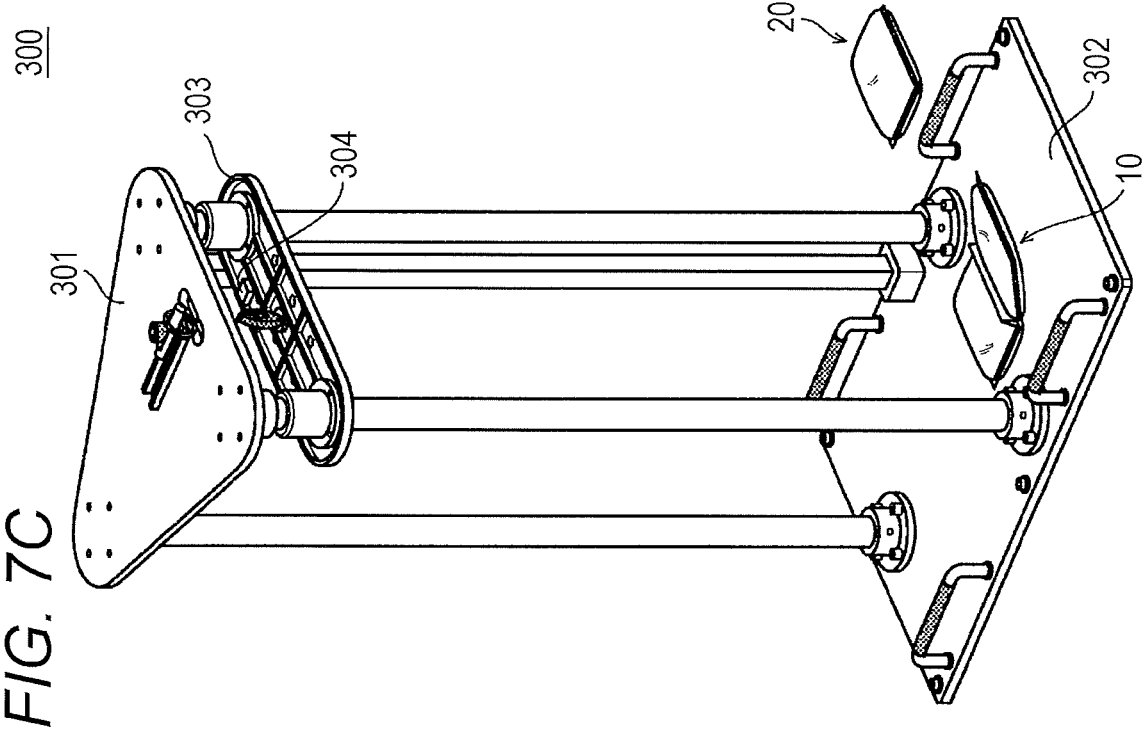
FIG. 7C shows a state of a drop test with a drop testing device.
Figure 7A:
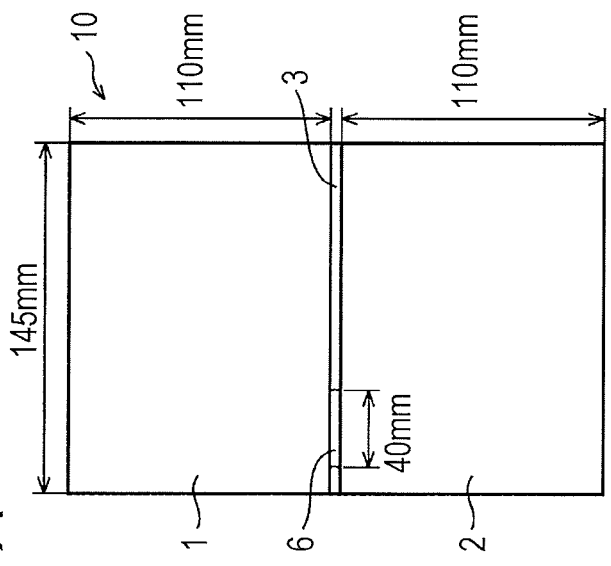
FIG. 7A shows the air cushioning material according to this embodiment, to be used as an object for evaluation of a cushioning force.
Figure 7B:
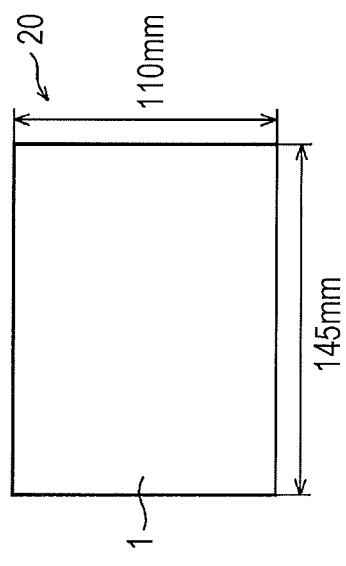
FIG. 7B shows a single-cell type air cushioning material as a comparative example.

The inventors evaluated cushioning performance of the air cushioning material with a drop testing device 300 shown in FIG. 7C, by using the air cushioning material 10 having dimensions shown in FIG. 7A, and a single-cell type air cushioning material 20 having dimensions shown in FIG. 7B, as evaluation targets.

In the air cushioning material 10 in FIG. 7A, a lateral width is 145 mm and a longitudinal width is 110 mm, of the air cells 1 and 2 of the air cushioning material 10 shown in FIG. 1. Further, a passage width of the air flow passage 6 is 40 mm. As shown in FIG. 7B, the single-cell type air cushioning material 20 is a single-cell air cushioning material made of one air cell without an intermediate belt-like part, and has a lateral width of 145 mm and a longitudinal width of 110 mm.

FIG. 7C shows a test environment of the drop test with the drop testing device 300. The air cushioning materials 10 and 20 are placed on a pedestal 302 under the drop testing device 300, and a weight 303 of 1.2 kg is dropped from a pedestal 301 at a height of 300 mm.

An acceleration sensor 304 is attached to the weight 303, and an acceleration (G value) measured by the acceleration sensor 304 attached to the weight 303 is plotted on a graph in units of 1 millisecond when the weight 303 collides with the air cushioning materials 10 and 20. Since the acceleration here is a value of impact received by a body subjected to the cushioning, a smaller acceleration indicates a higher cushioning performance.

Figure 8A:
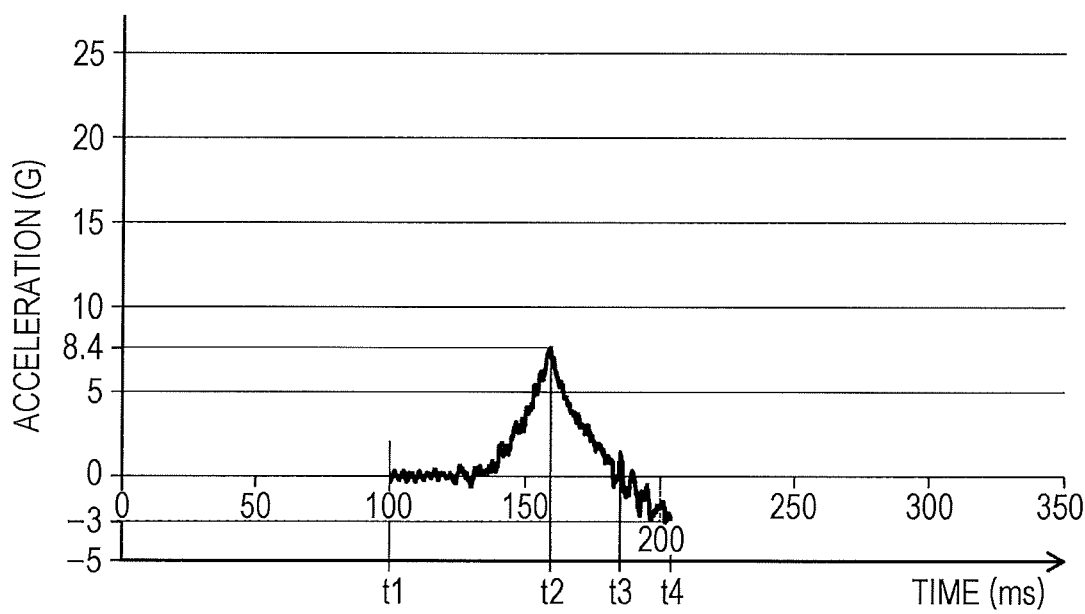
FIG. 8A is a graph showing acceleration experienced by a weight with time accuracy of several milliseconds when the weight of the drop testing device collides with the air cushioning material according to the present embodiment.
Figure 8B:
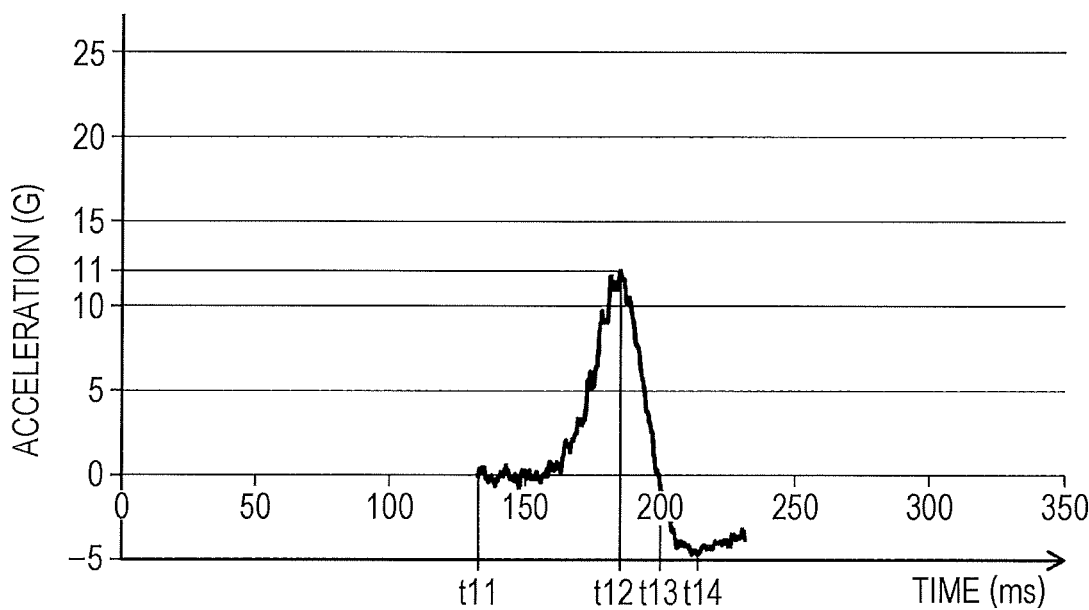
FIG. 8B is a graph showing acceleration experienced by the weight with time accuracy of several milliseconds when the weight collides with the air cushioning material of the comparative example.

FIGS. 8A and 8B are graphs respectively showing results of the drop test in the air cushioning material 10 according to the present embodiment and the air cushioning material 20 in the comparative example.

In the graphs of FIGS. 8A and 8B, a negative acceleration indicates an acceleration acting on the weight 303 when the weight 303 bounces on the air cushioning materials 10 and 20 to jump up.

When the single-cell air cushioning material 20 is used as the comparative example for a cushion for the weight 303, the weight comes into contact with the air cushioning material 20 at time t11 as shown in FIG. 8B, a cushioning force is generated by the air cushioning material 20, and the acceleration of the weight reaches a maximum value (11 G) at time t12.

Then, the acceleration of the weight 303 becomes "0" at time t13, and thereafter, a negative acceleration is generated. This indicates a negative acceleration due to the weight 303 bouncing on the single-cell type air cushioning material 20. Thereafter, when time t14 has elapsed, the acceleration reaches a negative maximum value (about −5 G).

On the other hand, when the air cushioning material 10 is used for a cushion of the weight 303, after the acceleration due to the cushioning force of the air cushioning material 10 is detected at time t1, the acceleration generated in the acceleration sensor 304 reaches a maximum value (8.4 G) at time t2. Then, the acceleration starts decreasing and becomes "0" at time t3. Thereafter, the detected acceleration is negative and becomes a minimum value (about −3 G) at time t4.

Comparison between both graphs shows that, in the air cushioning material 10 according to the present embodiment, as compared with the air cushioning material 20 of the comparative example, a maximum peak value of the acceleration is low (8.4 G in the present embodiment, 11 G in the comparative example), and the time to reach the peak value from the contact of the weight with the air cell is long (about 60 ms (=t2−t1) in the present embodiment, and about 50 ms (=t12−t11) in the comparative example).

This indicates that when the air cushioning material 10 is used for the air cushion, increase in air pressure inside the impacted air cell is suppressed by air movement through the air flow passage 6 having a high flow path resistance.

This shows that the cushioning property of the air cushioning material according to the present embodiment is high.

Figure 15:
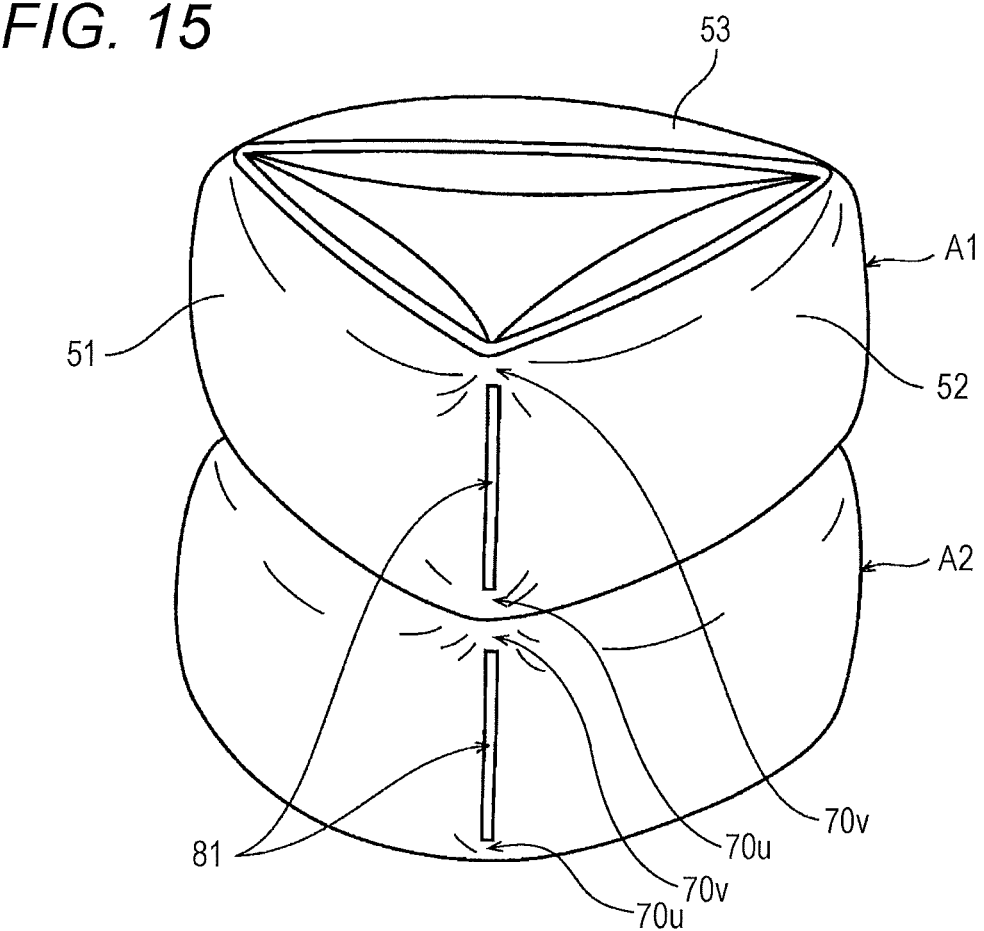
FIG. 15 is a schematic view showing a configuration of a conventional air cushioning material having a plurality of air cells.

The conventional product shown in FIG. 15 clearly has lower cushioning capacity than the product of this embodiment as there is no flow path resistance in the air flow passage between the adjacent air cells, and the air in the impacted air cell immediately escapes to the adjacent air cell.

[5] Manufacturing Method

An example of a manufacturing method of the air cushioning material 10 will be described with reference to FIGS. 9A to 9C and FIGS. 10A to 10D.

Figure 9A:
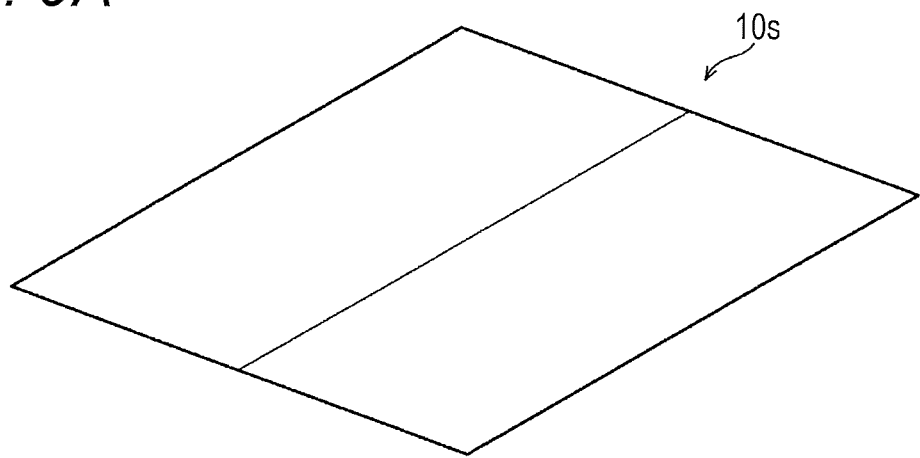
FIGS. 9A to 9C are views schematically showing a manufacturing process of the air cushioning material.
Figure 9B:
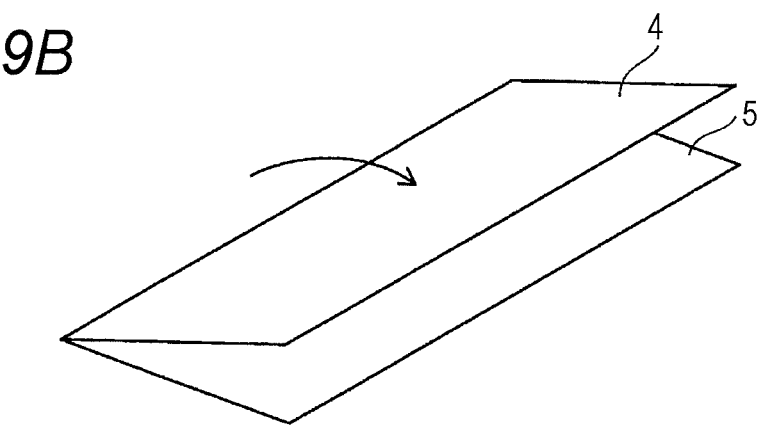
Figure 9C:
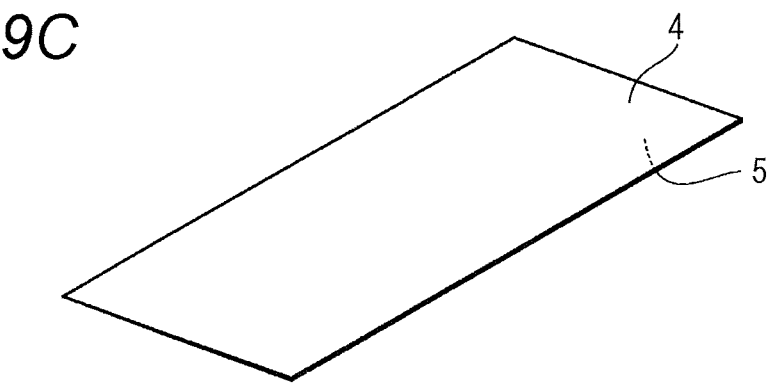

First, one large-sized long sheet 10s shown in FIG. 9A is folded over as shown in FIGS. 9B and 9C to obtain a front sheet part 4 and a rear sheet part 5.

Figure 10A:
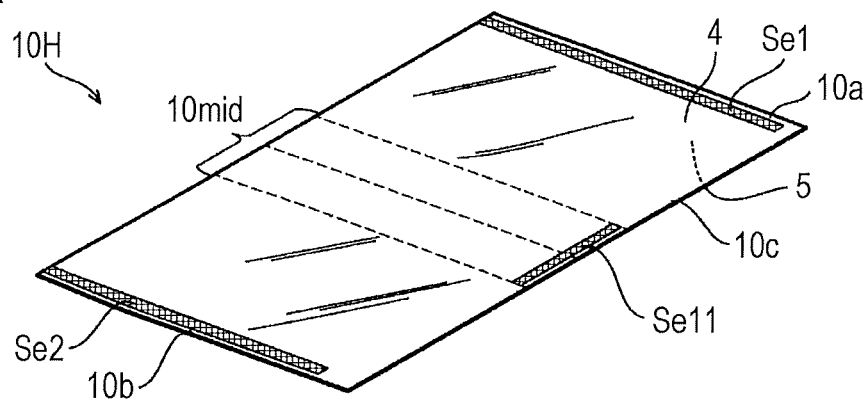
FIGS. 10A to 10D are views schematically showing the manufacturing process of the air cushioning material continuing from FIGS. 9A to 9C.

Subsequently, as shown in FIG. 10A, the peripheral edges 10a, 10b, and 10c of the front sheet part 4 and rear sheet part are sealed by applying welding Se1, Se2, and Se11, to obtain a bag body 10H.

Figure 10B:
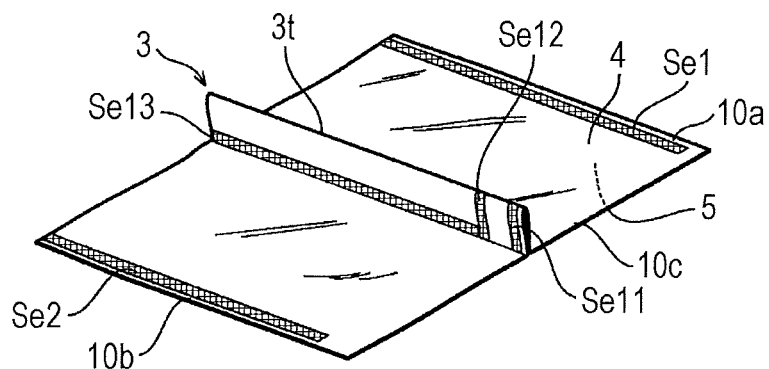
Figure 10C:
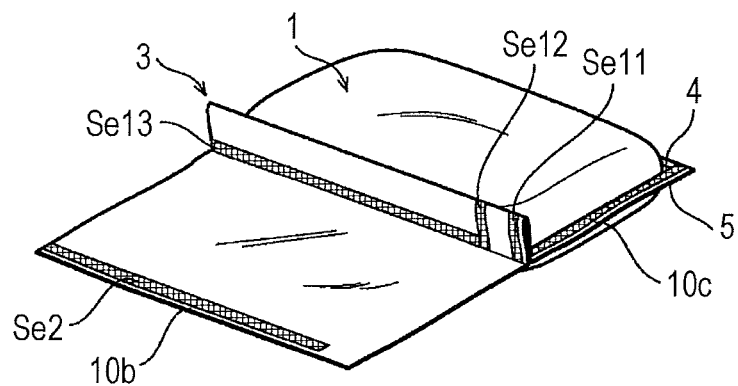

A center part 10 mid of the bag body 10H in FIG. 10A is folded and protruded upward to form the intermediate belt-like part 3 as shown in FIG. 10B, and applied with the welding Se12 and Se13.

Air is sent by a blower from the peripheral edge 10c side to inflate an inside of the air cell 1, and then a part of the air cell 1 in the peripheral edge 10c is sealed by welding. This results in a state of the air cushioning material 10 shown in FIG. 10C. Similarly, air is sent by a blower from the peripheral edge 10c side to inflate the air cell 2, and then a part of the air cell 2 in the peripheral edge 10c is sealed by welding.

Figure 10D:
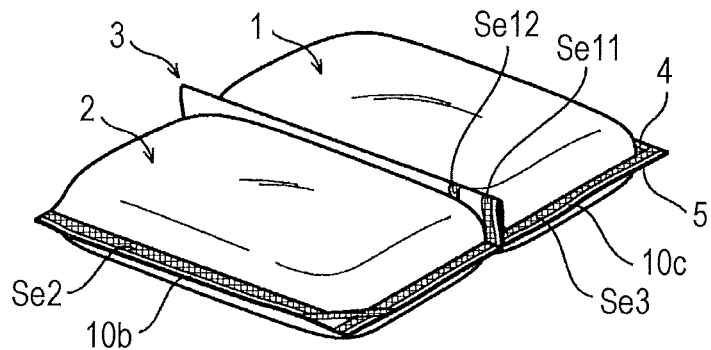

This results in a state of the air cushioning material 10 shown in FIG. 10D, and the peripheral edge 10c is welded by the welded part Se3. Alternatively, air may be blown into the air cells 1 and 2 at a same time, and the entire peripheral edge 10c may be welded and sealed at once.

Moreover, the state of FIG. 9C may be created from two sheets. Further, in FIGS. 10C and 10D, an air inlet may be provided at a corner part of the welded part of each air cell, and this part may be welded and sealed after air blowing.

[6] SUMMARY

As described above, according to the present embodiment, since the air flow passage 6 formed in the intermediate belt-like part 3 is folded in the middle, the air passing through the air flow passage 6 receives a high flow path resistance.

Since an air flow generated by the impact from outside is transferred to the other air cell via such the air flow passage 6, it is possible to suppress increase in the internal pressure of the inner space of the air cell on the impacted side, and to avoid rapid expansion of the air cell into which the air flows in, by reducing a moving speed of the air flow passing through the air flow passage 6.

In addition, since the air cushioning material 10 according to the above-described embodiment can enhance the cushioning performance of the air cushioning material without separately adding another part such as a check valve, high quality transportation can be realized at low cost.

The air cushioning material according to the above embodiment can reduce usage of petroleum-based materials as compared to foamed polystyrene or the like, contributing to resource saving while providing a sufficient cushioning property.

MODIFICATION

Although the present invention has been described based on the embodiment, needless to say that the present invention is not limited to the above-mentioned embodiment, and the following modifications can be implemented.

Modification 1

In the above embodiment, the angle of the air cell 2 with respect to the air cell 1 can be freely changed with the intermediate belt-like part 3 as a boundary. However, this requires confirmation that the intermediate belt-like part 3 is positioned inside to form the L-shape before being inserted between the packing box and the packing object each time of attachment to the packing object, causing large inconvenience.

In view of this, in this modification, the air cushioning material 10 is processed in advance so as to maintain a state of being bent in a substantially L-shape with the intermediate belt-like part 3 positioned inside.

Figure 11A:
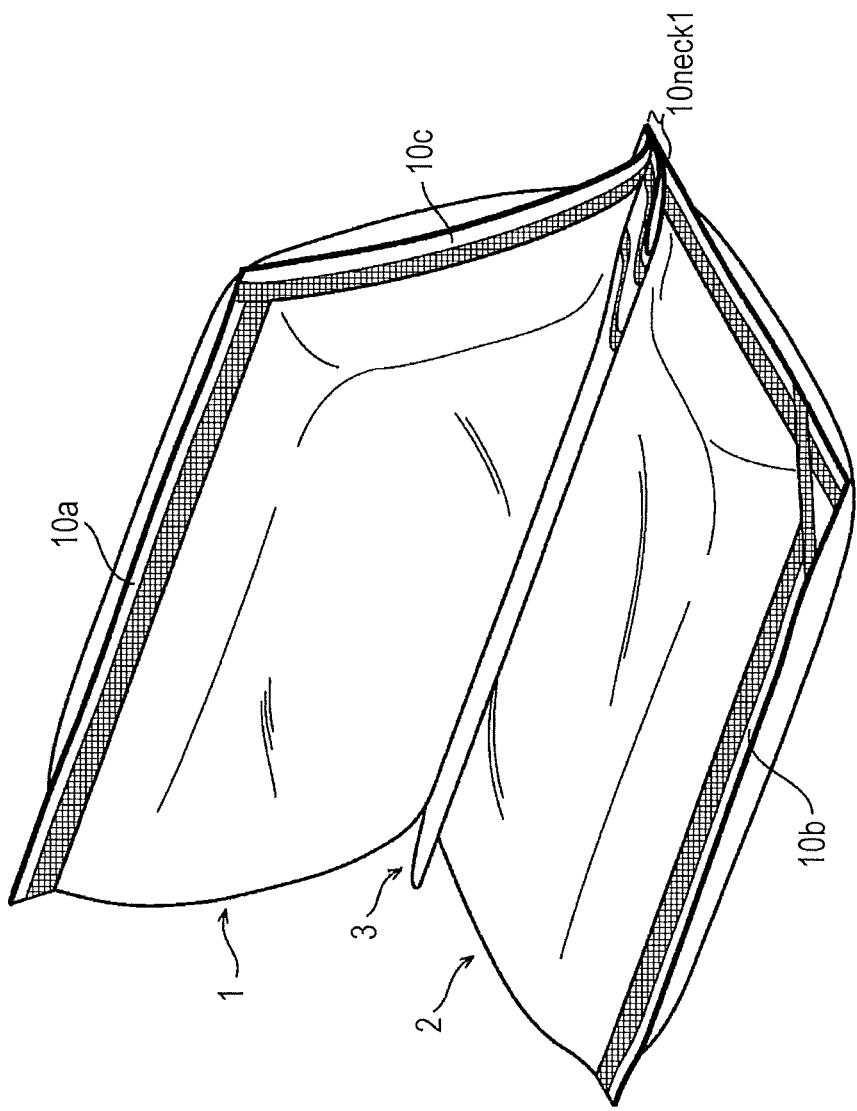
FIGS. 11A and 11B show the air cushioning material in a state of being welded on a side opposite to a folded part of the intermediate belt-like part such that the two air cells are opened in an L-shape with the intermediate belt-like part facing inward.
Figure 11B:
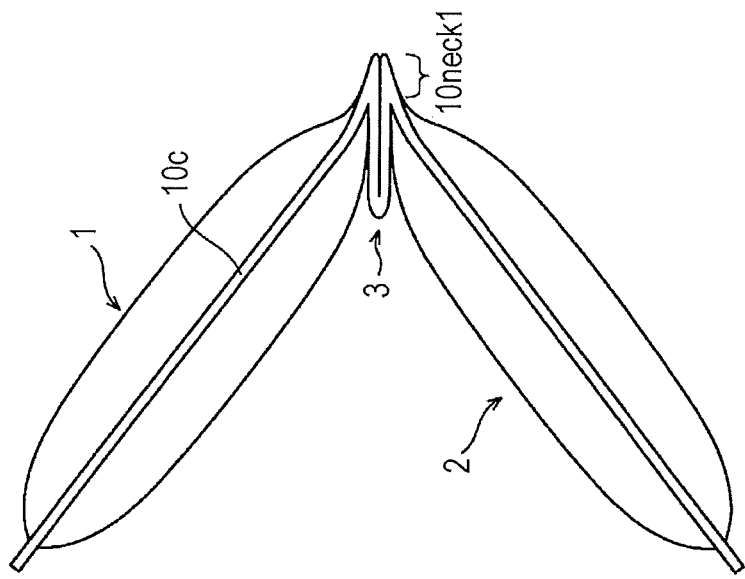

FIGS. 11A and 11B are views showing the air cushioning material 10 in a state where a part 10 neck 1 is pinched and welded, which is near the root of the intermediate belt-like part 3 and on a side opposite to the air flow passage 6 among the air cells 1 and 2. FIG. 11A shows an overall appearance of the air cushioning material 10, and FIG. 11B shows a side view thereof.

Since such the welding holds the bent posture of the air cells 1 and 2 at a predetermined angle with the intermediate belt-like part 3 positioned inside (this angle does not necessarily have to be exactly 90°, but may be any angle as long as a packing operator can clearly recognize that the air cushioning material 10 is bent with the intermediate cushioning part 3 positioned inside, for example in a range of 70° to 120°), enabling easy attachment to the packing object.

Meanwhile, a holder (position holder) that holds the air cushioning material 10 in a folded position as described above is not limited to a case where the part 10 neck 1 is fixed by welding, but 10 neck 1 may be fixed with use of an adhesive, or may be pinched by a clip or the like. Further, the fixed position may extend over the entire longitudinal direction of the intermediate belt-like part 3, or may be a partial range.

Modification 2

In the above embodiment, the air flow passage 6 is formed at one location alone in the longitudinal direction of the intermediate belt-like part 3 (see FIGS. 1, 4A, and 4B), but the air flow passage may be provided at two locations in the longitudinal direction of the intermediate belt-like part 3

Figure 12A:
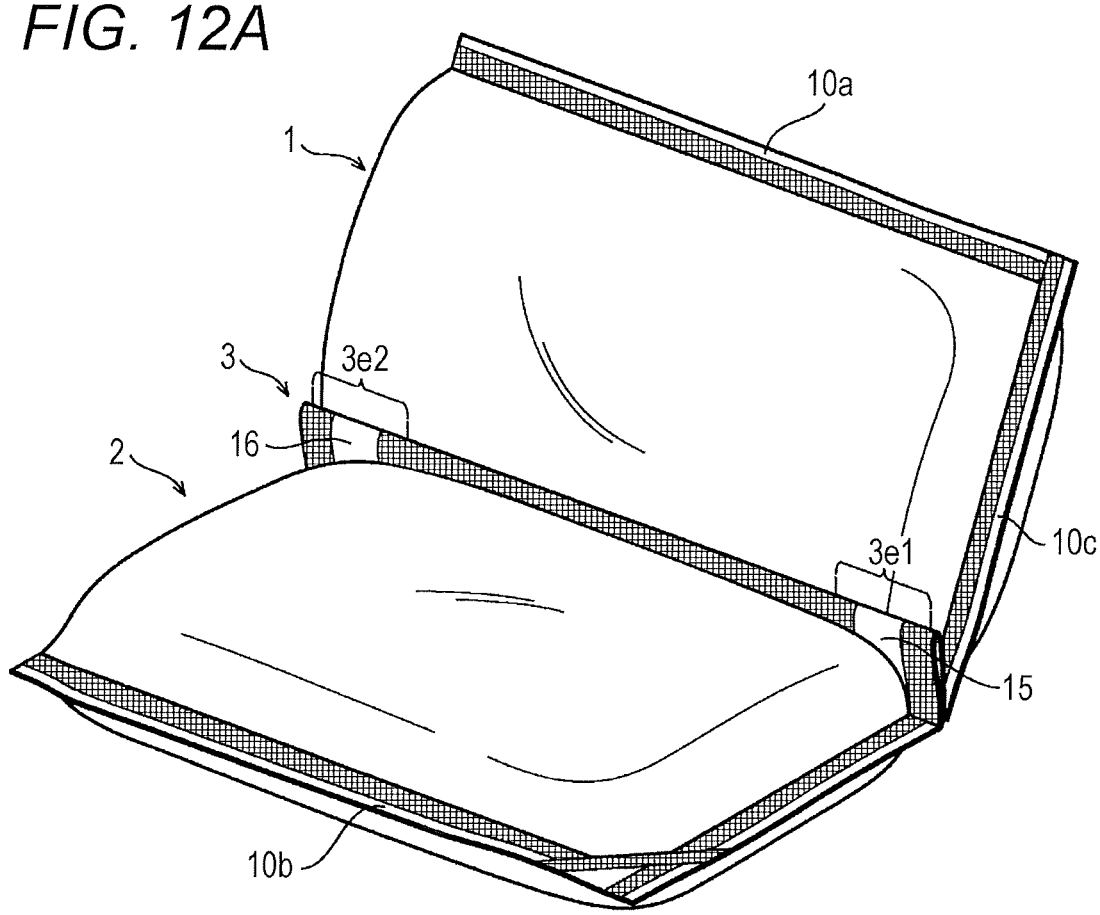
FIGS. 12A to 12C show a modification of the air cushioning material in which air flow passages are formed at both ends in a longitudinal direction of the intermediate belt-like part.
Figure 12B:
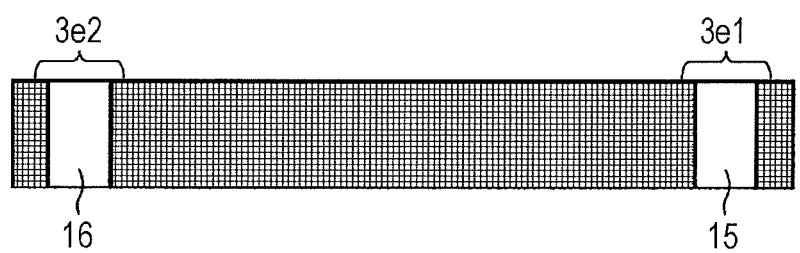
Figure 12C:
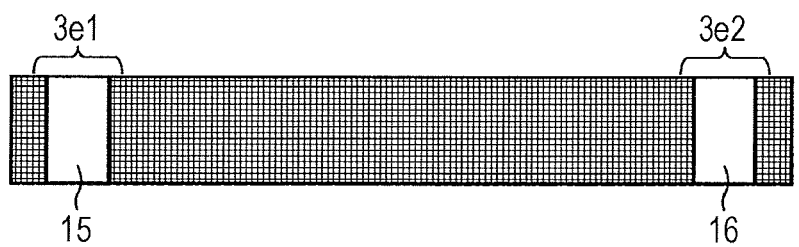

FIG. 12A is an external view of an air cushioning material 10 according to this modification, FIG. 12B is a front view of the intermediate belt-like part 3 alone as viewed from the air cell 2 side, and FIG. 12C is a view showing a rear surface of the intermediate belt-like part 3 in FIG. 12B.

As shown in each figure, in addition to an air flow passage 15 of the end-vicinity part 3e1 in longitudinal direction of the intermediate belt-like part 3, an air flow passage 16 is also formed in the another end-vicinity part 3e2.

By providing two air flow passages in this manner, even if one of the air flow passages is clogged due to some circumstances, air moves to an adjacent air cell via another air flow passage, enabling good cushioning property to be maintained while ensuring suppression of rupture of the impacted air cell.

Although the positions provided with two air flow passages are not necessarily required to be near both ends of the intermediate belt-like part 3 as shown in FIGS. 12A to 12C, it is desirable to provide the air flow passages at symmetrical positions in the longitudinal direction of the intermediate belt-like part 3 (positions equidistant from a longitudinal center of the intermediate belt-like part 3).

Since providing the air flow passages at such symmetrical positions allows an air flow from the air cell 1 to be almost equally divided into two air flow passages to flow out to the air cell 2 side when the air cell 1 receives a large external force, deformation amount in a direction along the intermediate belt-like part 3 of the air cell 1 subjected to the external force easily becomes uniform, enabling expectation of an effect of eliminating positional variation of the cushioning force.

Further, the air flow passage may be provided at a plurality of locations of three or more. Even in this case, the plurality of air flow passages are desirably provided at symmetrical positions in the longitudinal direction of the intermediate belt-like part 3.

Modification 3

In the above embodiment, the air flow passage 6 is linearly provided over the air cell 1 to the air cell 2, and is formed in a manner of being folded back and laminated at the top part 3t of the intermediate belt-like part 3 (see FIGS. 1, 4A, and FIG. 4B).

On the other hand, in an air cushioning material 10 of Modification 3, an air flow passage is formed so as to pass through the intermediate belt-like part 3 in a manner of being bent in a cranked shape in the middle.

Figure 13A:
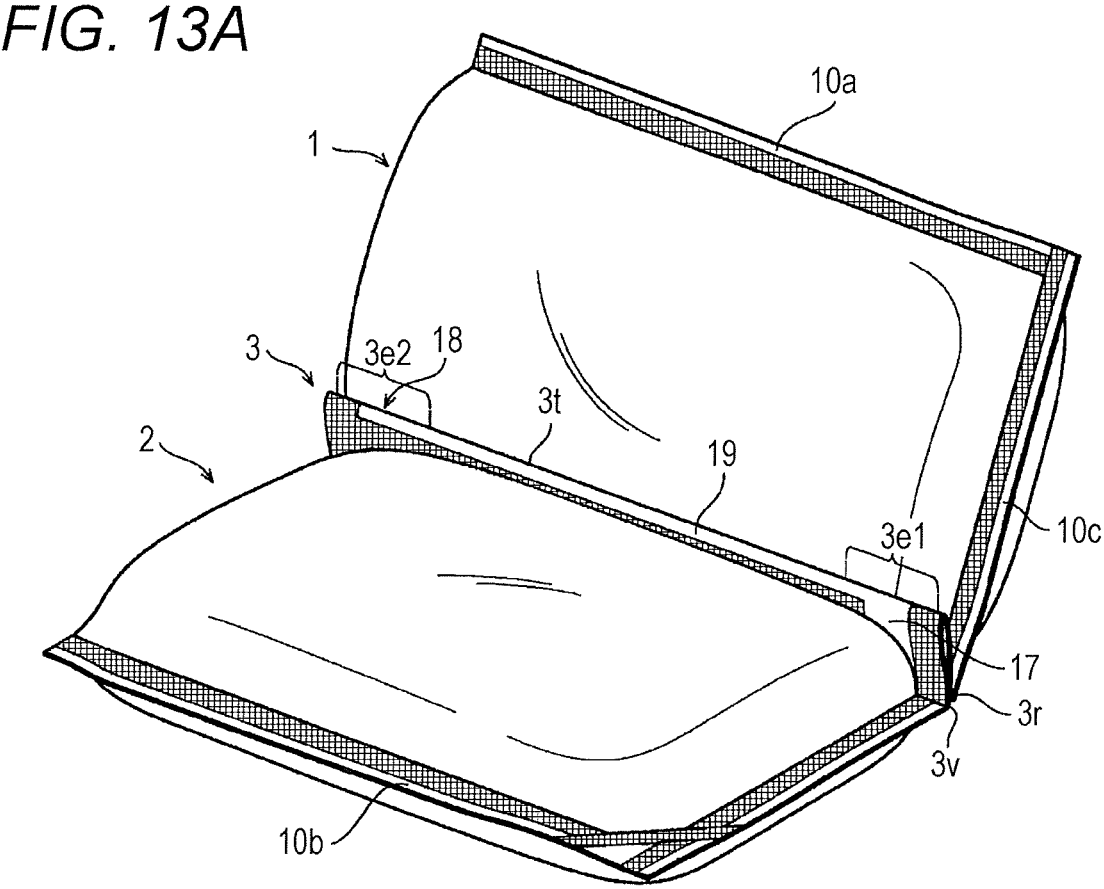
FIGS. 13A to 13C show a modification of the air cushioning material when the air flow passage includes a part extending in the longitudinal direction of the intermediate belt-like part to have a crank shape.
Figure 13B:
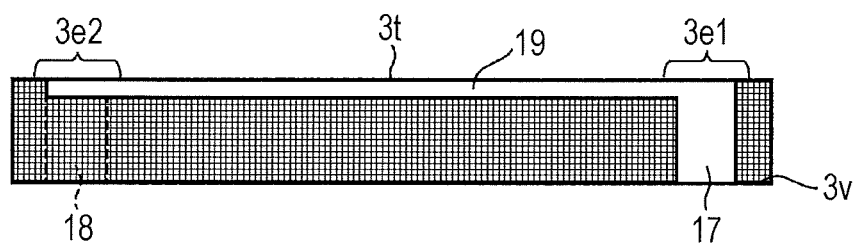
Figure 13C:
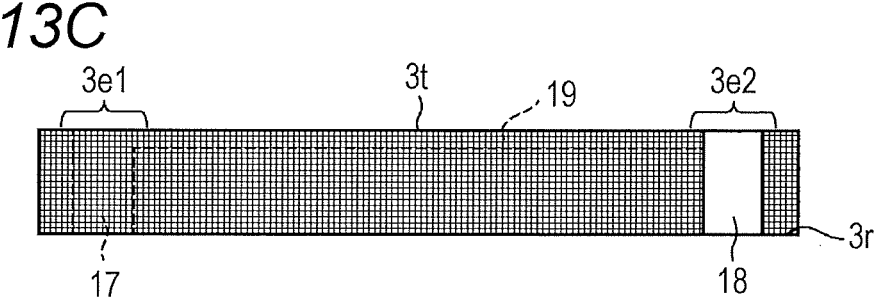

FIG. 13A is an external view of the air cushioning material 10 according to this modification, FIG. 13B is a front view of the intermediate belt-like part 3 alone as viewed from the air cell 2 side, and FIG. 13C is a view showing a rear surface of the intermediate belt-like part 3 in FIG. 13B.

As shown in FIG. 13B, there is formed the flow passage 17 (first passage) extending from the root part 3v on the air cell 2 side of the folded intermediate belt-like part 3 to the top part 3t at a region 3e1 closer to one end in the longitudinal direction of the inter mediate belt-like part 3, while there is formed, as shown in FIG. 13C, the flow passage 18 (third passage) extending from the root part 3r on the air cell 1 side of the intermediate belt-like part 3 to the top part 3t at a region 3e2 closer to another end in the longitudinal direction of the intermediate belt-like part 3.

Then, a connecting passage 19 (second passage) that connects these air flow passages 17 and 18 is formed along the longitudinal direction of the top part 3t of the intermediate belt-like part 3 (FIG. 13B).

According to this modification, even if the height h1 of the intermediate belt-like part 3 (see FIGS. 4A and 4B) is limited, it is possible to secure a long path length of the air flow passage, and it is possible to increase a flow path resistance of the air flow passage as much as necessary, enabling enhancement of the cushioning capability of the air cushioning material 10.

Modification 4

Figure 14:
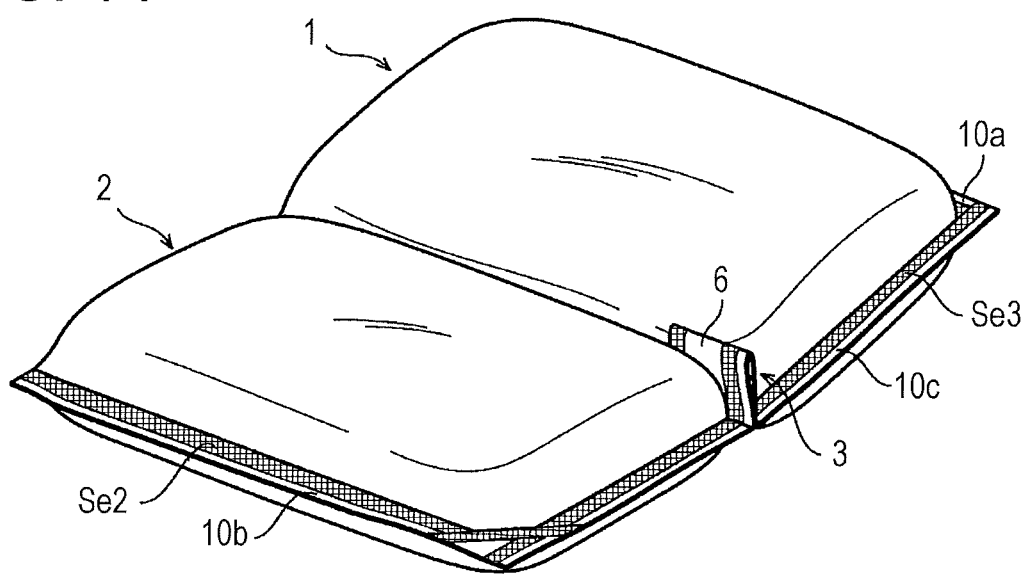
FIG. 14 shows a modification of the air cushioning material in which a part including the air flow passage in the intermediate belt-like part exclusively has a folded shape.

In the air cushioning material 10 of FIG. 1, the entire intermediate belt-like part 3 in the longitudinal direction is formed in the folded shape. However, as shown in the external view of FIG. 14, it is possible to impart a flow path resistance to the air flow passage 6 even if at least a part provided with the air flow passage 6 in the intermediate belt-like part 3 is exclusively formed into a folded shape, enabling a similar effect as the above embodiment to be obtained.

Modification 5

In the intermediate belt-like part 3 shown in FIGS. 1, 4A, and 4B, air tightness of the air cells 1 and 2 is maintained by welding the peripheral edges 10a and 10b with the peripheral edge 10c. However, airtightness of the internal space may be maintained by bonding the peripheral edges 10*a* and 10*b* with the peripheral edge 10*c* with an adhesive.

Modification 6

In the air cushioning material 10 shown in FIG. 1, two air cells are coupled via the intermediate belt-like part 3. However, three or more air cells may be coupled via two or more intermediate belt-like parts, and each intermediate belt-like part may be provided with an air flow passage and folded. When three or more air cells are thus connected, the position holder in Modification 1 above is not necessarily formed in all the intermediate belt-like parts, but forming the position holder at any one of the intermediate belt-like parts alone is sufficient.

Moreover, the above embodiment and each modification may be combined as much as possible.

The present invention is suitable as an air cushioning material to be used for packing articles such as image forming apparatuses.

Although embodiments of the present invention have been described and illustrated in detail, the disclosed embodiments are made for purposes of illustration and example only and not limitation. The scope of the present invention should be interpreted by terms of the appended claims.

What is claimed is:

1. An air cushioning material comprising:
    a first air cell and a second air cell into which air is sealed,
    a belt-like part interconnecting the first air cell and the second air cell along side edges of the first and second air cells; and
    an air flow passage that is formed in the belt-like part and communicates the first and second air cells, wherein at least a part including the air flow passage in the belt-like part is in a shape folded in a way from the first air cell to the second air cell,
    wherein the belt-like part includes a pair of seals extending from one of the air cells to another of the air cells, and a third seal extending perpendicularly to and connected to one of the pair of seals.

2. The air cushioning material according to claim 1, further comprising
    a position holder that maintains the first and second air cells in a state of being bent with respect to each other, wherein a folded part of the belt-like part is positioned between the first and second air cells.

3. The air cushioning material according to claim 1, wherein
    the air flow passage is provided in at least two symmetrical positions in a longitudinal direction of the belt-like part.

4. The air cushioning material according to claim 1, wherein
    the air flow passage includes a first passage that is open to the first air cell, a second passage that is provided so as to extend along the longitudinal direction of the belt-like part, and a third passage that is open to the second air cell, and the first and third passages are connected via the second passage.

5. The air cushioning material according to claim 1, wherein
    by welding the folded part of the belt-like part along the longitudinal direction of the belt-like part, one space is partitioned to form the first and second air cells.

6. The air cushioning material according to claim 1, wherein
    the first air cell in the first and second air cells is arranged to protect a surface on one side of a corner part of a packing object, and the second air cell is arranged to protect a surface on another side of the corner part of the packing object.

7. The air cushioning material according to claim 1, wherein
    at least the part including the air flow passage in the belt-like part is a part to be arranged to face a corner part of the packing object.

8. The air cushioning material according to claim 6, wherein
    the packing object is an article to be transported.

9. The air cushioning material according to claim 1, wherein the belt-like part is configured such that air only passes from one of the air cells to another of the air cells when a pressure applied to the one air cell exceeds a predetermined amount.

10. The air cushioning material according to claim 1, wherein when in use cushioning a product, the belt-like part is not inflated.

11. The air cushioning material according to claim 1, wherein when the air cells are arranged perpendicular with respect to each other, the belt-like part is configure between the air cells.

12. The air cushioning material according to claim 1, wherein a majority of the belt-like part is not open to the air cells.

* * * * *